(12) United States Patent
Konno et al.

(10) Patent No.: US 8,938,938 B2
(45) Date of Patent: Jan. 27, 2015

(54) PACKAGING AND FILLING MACHINE

(75) Inventors: Hidetoshi Konno, Tokyo (JP); Yutaka Kaneko, Tokyo (JP)

(73) Assignee: Tetra Laval Holdings & Finance S.A., Pully (CH)

( * ) Notice: Subject to any disclaimer, the term of this patent is extended or adjusted under 35 U.S.C. 154(b) by 765 days.

(21) Appl. No.: 12/991,955

(22) PCT Filed: May 5, 2009

(86) PCT No.: PCT/JP2009/001992
§ 371 (c)(1),
(2), (4) Date: Dec. 28, 2010

(87) PCT Pub. No.: WO2009/139129
PCT Pub. Date: Nov. 19, 2009

(65) Prior Publication Data
US 2011/0099955 A1    May 5, 2011

(30) Foreign Application Priority Data

May 11, 2008   (JP) ................................. 2008-124114
Dec. 25, 2008   (JP) ................................. 2008-331080
Dec. 26, 2008   (JP) ................................. 2008-332512

(51) Int. Cl.
*B65B 9/06*   (2012.01)
(52) U.S. Cl.
USPC .................... 53/551; 53/554; 53/558; 53/451
(58) Field of Classification Search
USPC .................... 53/551, 554, 567, 558, 433, 451
See application file for complete search history.

(56) References Cited

U.S. PATENT DOCUMENTS

| 4,747,253 | A | | 5/1988 | Schulte |
| 4,809,485 | A | * | 3/1989 | Nielsen ........................... 53/503 |
| 4,958,665 | A | | 9/1990 | Iwano |
| 5,044,140 | A | * | 9/1991 | Iwano et al. .................... 53/167 |
| 2011/0185686 | A1 | | 8/2011 | Konno et al. |

FOREIGN PATENT DOCUMENTS

| JP | 59-84706 A | 5/1984 |
| JP | 1-82102 U | 6/1989 |
| JP | 9-169316 A | 6/1997 |

(Continued)

OTHER PUBLICATIONS

International Search Report (PCT/ISA/210) issued on Aug. 18, 2009, by Japanese Patent Office as the International Searching Authority for International Application No. PCT/JP2009/001992.

*Primary Examiner* — Sameh H. Tawfik
(74) *Attorney, Agent, or Firm* — Buchanan Ingersoll & Rooney P.C.

(57) ABSTRACT

A packaging and filling machine is capable of easily preforming with the forming flaps by keeping the pressure of the filled liquid food in the tube the positive pressure, capable of preventing the pressure of the liquid food from dropping to negative pressure, even if the pressure of the liquid food decreases due to the up-and-down of the liquid food pressure, and capable of preventing outside atmosphere materials from invading into the tube.

A positive pressure keeping means absorbs fluctuation of the pressure of the liquid food in the tube below the pressure flange, and prevents the liquid food pressure from dropping in negative pressure to keep the pressure of the liquid food in the tube below the pressure flange a positive pressure.

2 Claims, 8 Drawing Sheets

(56) References Cited  * cited by examiner

FOREIGN PATENT DOCUMENTS

| JP | 2001-233307 A | 8/2001 |
| JP | 2008-107317 A | 5/2008 |

PACKAGING AND FILLING MACHINE

FIELD OF THE INVENTION

This invention relates to a packaging and filling machine to fill and pack something to drink in containers.

BACKGROUND ART

When packaged containers filled up liquid food such as milk, mineral water, tea, juice, soup, alcohol are manufactured, a web-shaped laminated packaging materials are used. The web-like packaging laminated material is spliced in splices in the next packaging laminated material. A packaged container is formed by continually sealing the packaging laminated material with heat-sealing, ultrasonic sealing and the like.

For example, in a packaging and filling machine, a packaging laminated material is spliced in a splice of the next packaging laminated material. Strip is joined continually in the edge of the packaging laminated material. The packaging laminated material is formed into a tube-shaped shape. Both end sides of the packaging material are overlaid on each other to form an overlap. The overlap is pressed by a strip covering an inner edge section face of longitudinal sealing, and the overlap is sealed with a longitudinal seal element along the longitudinal direction. In the aseptically covering atmosphere in an aseptic chamber, a packaging laminated material is sealed in transverse direction by a transversal seal device while filling up liquid food in the tube-shaped packaging laminated material, and the packaging laminated material is cut. A pillow-shaped preliminary container is formed. A preliminary container is further formed into the predetermined shape, and a packaged container is completed.

Figure 4:
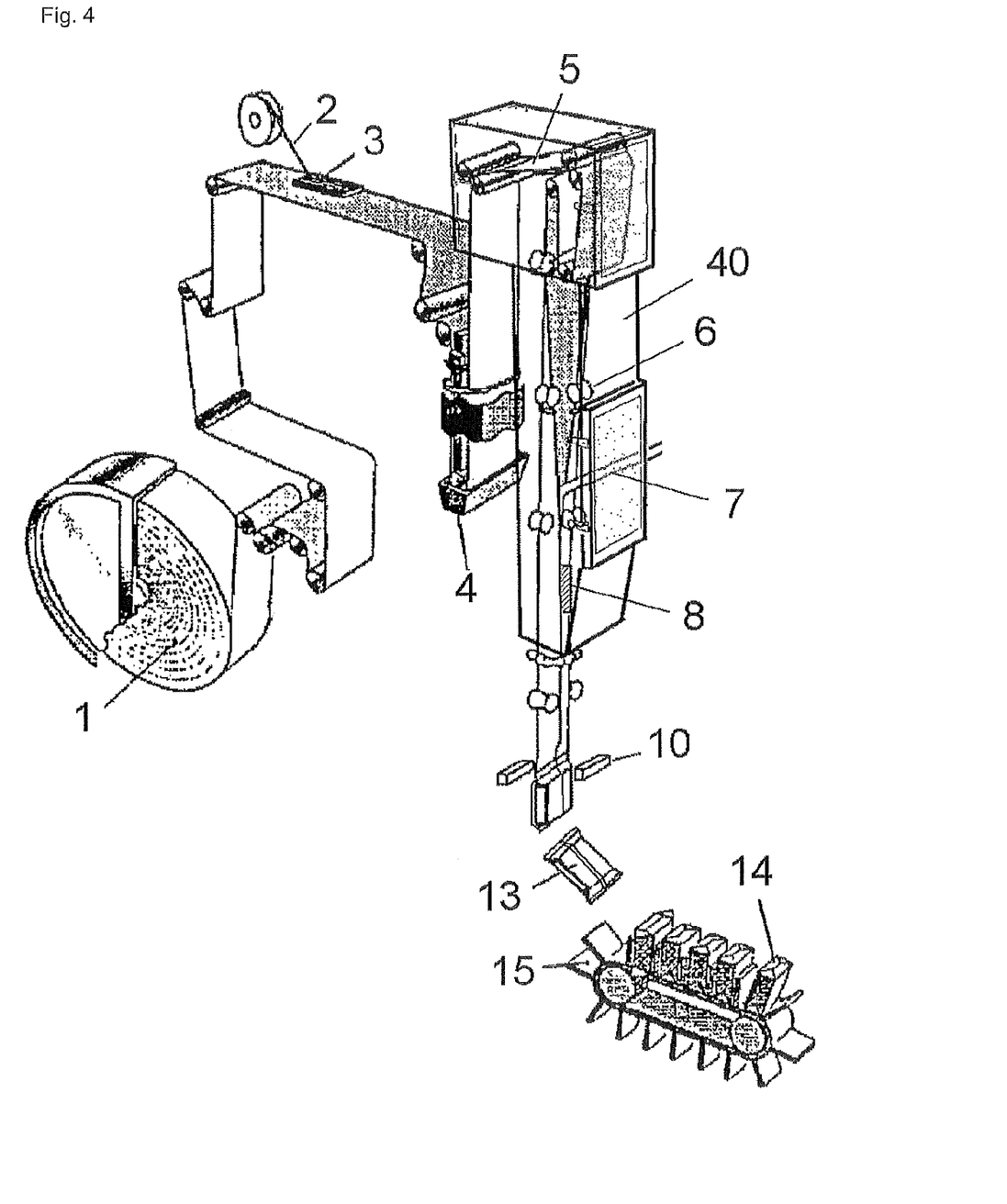
FIG. 4 is an outline perspective view showing an example of the packaging and filling machine usable in this invention.

FIG. 4 is an outline perspective diagram showing an example of a packaging and filling machine. A reel-like, web-shaped packaging laminated material 1 is loaded into the packaging and filling machine. The packaging laminated material 1 comprises a flexible laminate laminating a paper substrate and polyethylene resin layers on both sides of the paper substrate. A barrier layer including aluminum foil, gas barrier resin and the like is formed between the paper substrate and the film layer, if necessary. Decorations are printed on sections corresponding to the surface of packaged container 14.

The unwound packaging laminated material 1 is transported continually with a feeder of the transporting means, and is transported to a strip applicator 3 through bending rollers, and damper rollers, With splicing of the next strip, a strip 2 is continually applied onto one edge of the packaging laminated material 1 by a strip applicator.

A pull-tab is applied to the packaging laminated material 1, if necessary, by a pull-tab applicator. The packaging laminated material 1 is transferred to a sterilizing tank 4, and is sterilized in sterilizing tank 4 with a sterilizing liquid of hydrogen peroxide and the like. The packaging laminated material 1 is carried to an air knife 5 to be dried by the air knife 5. The packaging laminated material 1 is carried into an aseptic chamber 40 assuring that liquid food is filled up the tube-like packaging material with the aseptic atmosphere. The packaging laminated material 1 is transformed gradually with forming rings 6, and other forming rings to be formed to the tube-like shape.

The tube-like packaging laminated material 1 is preheated by hot air from a preheat means 8 of a longitudinal seal device to be sealed longitudinally. The liquid food is filled up into the tube-like packaging laminated material 1 from a bottom end of a filling pipe 7 outlet.

Figure 5:
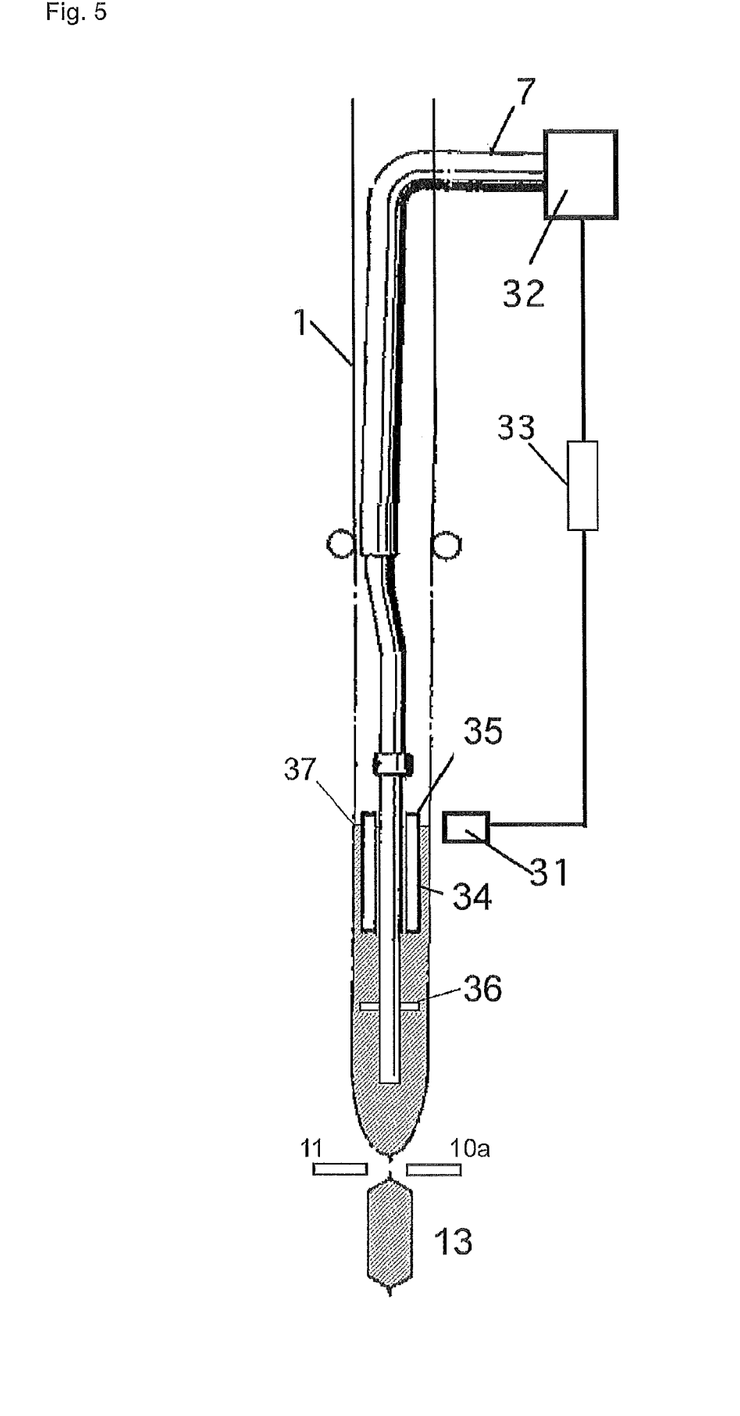
FIG. 5 is a sectional front view explaining a liquid level control of the packaging and filling machine.

An example of filling up liquid food to the predetermined liquid level from a filling pipe in a tube-like packaging material is shown in FIG. 5.

A vertical portion of the filling pipe 7 is inserted into the internal lower part of the tube-like packaging material 1. The upstream portion is connected to a control valve 32. A cylindrical float 34 is arranged around the periphery of the vertical portion of the filling pipe 7. The float 34 floating in the liquid food and being between the tube packaging material 1 and the filling pipe 7 is put around the external surface of the vertical portion of the filling pipe 7 with freely up-down movability. A means to be detected 35 (a magnet, a transmitter, a tag and the like) is installed to the float 34, A detector 31 is arranged in the outside of the tube 1. The detector 31 converts a change of the strength and the weakness of signal from the means to be detected into electric current, and the detector outputs as the electric signal. The detector outputs a stop signal at more than the predetermined level and an open signal at less than the predetermined level, respectively, to a controlling means 33. A flow control valve 32 is equipped in the upstream portion of the filling pipe 7, and the flow control valve 32 is controlled by the control means 33.

A liquid level of the liquid is coordinated to the predetermined level. (Referred Patent Documents 1)

The tube-like packaging laminated material 1 is guided downward and is carried to the transversal seal device 10, as shown in FIG. 4. The tube-like packaging laminated material 1 is heat-sealed with press along the transverse direction, and it is formed as a container shape. The transversal sealed packaging laminated material is cut with a knife, and a pillow-like preliminary container (preformed body) 13 is formed.

Figure 6:
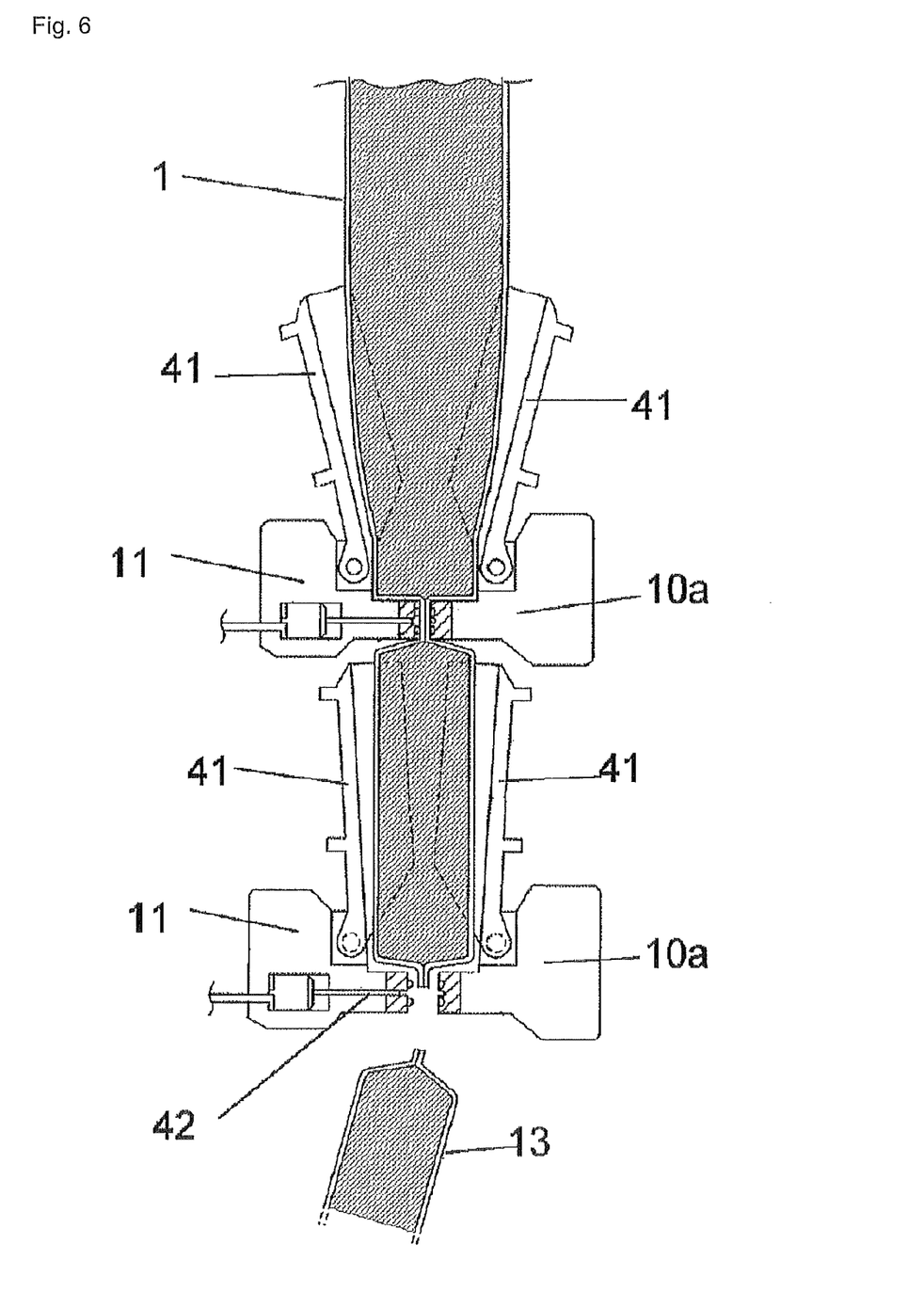
FIG. 6 is a sectional front view explaining the transversal seal device of the packaging and filling machine.

Detailed partial cross-sectional view of the transversal seal device 10 is shown for FIG. 6. At first, in this embodiment, the tube-like packaging material 1 with the filled food is held with an upper pair of a seal jaw 10a and a facing jaw 11. While the tube-like packaging material 1 is carried downward for a distance of the length corresponding to only one packaged container, it is held by a pair of upper forming flaps 41 and 41, and it is formed as an approximate container shape. Two transversal seal zones are formed by the transversal sealing transversally. The middle of the seal zones of the connected pillow-like preforming bodies is cut by the knife 42, and separated pillow-like preformed bodies 13 are formed.

In the embodiment shown in FIG. 6, for high-speed transversal sealing, preforming and cutting, two pairs of the seal jaw and the facing jaw, and forming flaps are equipped and, the first pair which finished the transversal sealing, preforming and cutting steps is evacuated aside, and it returns upward, next transversal sealing, preforming and cutting steps are repeated.

The preliminary container 13 is conveyed and is formed to the final shape by a final forming device 15, as shown in FIG. 4, and a liquid-food filled packaged container 14 is produced.

[Patent Documents 1]
JP 01-82102 Y

SUMMARY OF THE INVENTION

Problem to be Solved by the Invention

In the above-mentioned packaging and filling system, pressure of liquid food filled in the tube is positive pressure corresponding to a depth of the liquid from the liquid level. When the packaging material is formed with the forming flaps, the positive pressure of the liquid food in the tube is combined with an external pressure of the forming flaps to form the packaging material well.

In addition, keeping such positive pressure keeps the filled foods good hygienic conditions, too. That is, even if the packaging material has slight cracks, cracking and pinholes, the liquid food leaks from such points only outside, but any outside atmosphere substance does not invade the tube and does not pollute the liquid food in the tube.

It is an object of the invention to provide with a packaging and filling machine capable of easily preforming with the forming flaps by keeping the pressure of the filled liquid food in the tube the positive pressure, capable of preventing the pressure of the liquid food from dropping to negative pressure, even if the pressure of the liquid food decreases due to the changes of the liquid food pressure, and capable of preventing outside atmosphere materials from invading into the tube.

Means to Solve the Problem

In a packaging and filling machine of this invention, a web-like packaging laminated material is spliced in a splice of next web-like packaging laminated material, the web-like packaging material is fed continually and is formed to tube shapes, the tube overlapped in both ends of the packaging material is longitudinally sealed along the longitudinal direction, liquid food is filled up to a liquid level of a predetermined position above an outlet of a filling pipe from the filling pipe in the tube-like packaging material conveyed continually and vertically downward, while the tube is held with seal jaws and counter jaws along transversal direction below the liquid level, and is pulled down, the tube is transversally sealed, while the tube is held with seal jaws and counter jaws along transversal direction below the liquid level, and the tube is held with forming flaps at the same time to be preformed, the tube is cut in the transversal seal zone, and packaged containers are manufactured, characterized in that;

the packaging and filling machine comprises a pressure flange and a positive pressure keeping means, the pressure flange is arranged around the periphery of filling pipe below the liquid level in the tube-like packaging material, the pressure flange controls free flows from the lower part to the upper part about the liquid food filled in the tube to keep the pressure of the liquid food in the tube below the pressure flange a positive pressure, and to make the preforming with forming flaps easy, the positive pressure keeping means absorbs fluctuation of the pressure of the liquid food in the tube below the pressure flange, and prevents the liquid food pressure from dropping in negative pressure to keep the pressure of the liquid food in the tube below the pressure flange a positive pressure.

In preferable embodiment of this invention, the pressure flange is arranged around the periphery of the filling pipe with freely up-and-down mobility according to the flow of the liquid food, for range between the predetermined upper limit and lower limit, when a pressure of the liquid food above the pressure flange drops, the pressure flange moves above, when a pressure of the liquid food below the pressure flange drops, the pressure flange moves downward and, absorbs decrease of the liquid food pressure to negative pressure to prevent outside atmosphere substance from making an invasion into the tube.

In preferable embodiment of this invention, a float floating on the liquid level on periphery of the filling pipe is arranged, a cross sectional area of the float has a shape increasing upward continuously or in a stepwise, and absorbs decrease of the liquid food pressure to negative pressure to prevent outside atmosphere substance from making an invasion into the tube.

In preferable embodiment of this invention, an adding adjustment means of the positive pressure keeping means adding the liquid food into the tube of the filling pipe at the lower position or the upper and lower positions about the pressure flange lower is equipped, the adding adjustment means absorbs decrease of the liquid food pressure to the negative pressure by periodical fluctuation of the liquid food pressure, and prevent any outside atmosphere substance from making an invasion into the tube.

Effects of Invention

According to the above-mentioned invention, the following action function is shown, and profitable effect is provided.

In a packaging and filling machine of this invention, a web-like packaging laminated material is formed to tube shapes, the tube overlapped in both ends of the packaging material is longitudinally sealed along the longitudinal direction, liquid food is filled up to a liquid level of a predetermined position above an outlet of a filling pipe from the filling pipe in the tube-like packaging material conveyed continually and vertically downward, while the tube is held with seal jaws and counter jaws along transversal direction below the liquid level, the tube is held with forming flaps at the same time to be preformed, the tube is cut in the transversal seal zone, and packaged containers are manufactured, Since the web-like packaging laminated material is spliced in a splice of next web-like packaging laminated material, when remaining amount of the web-like packaging material is low, the packaging can be filled up continually without stopping.

Because it is transversal sealed below the liquid level of the web-like packaging material which liquid food was filled up with, unnecessary air does not stay in a container, and good quality is kept.

In the packaging and filling, the pressure of the liquid food filled in the tube is positive pressure corresponding to depth of the liquid from the liquid level. When the packaging material is formed with the forming flaps, the material can be formed well below such positive pressure.

In the characteristic of this invention, the pressure flange is arranged on the periphery of the filling pipe below the liquid level in the tube-like packaging material.

While the tube-like packaging material is carried downward, the material is caught rapidly by the seal jaw and the counter jaw, and, in addition, the material is caught rapidly by a pair of the forming flaps. The liquid in the tube-like packaging material is pushed, and the pressure of the liquid food in the tube suddenly rises, and the positive pressure may be excess pressure. The excessively positive pressure rapidly raises the liquid level, and makes an unstable shakes and a difficulty of the liquid level control.

That is, this excessively positive pressure rapidly raises the liquid level, and shakes the level uncertainly. For example, the float 34 shown in FIG. 5 is shacked up and down greatly, and, as a result, a control means 33 cannot control the level.

In the invention, the pressure flange controls the free flows from the lower part to the upper part of the liquid food filled in the tube to keep the pressure of the liquid food in the tube below the pressure flange the proper positive pressure, and to make the preforming with forming flaps easy. In addition, even if the liquid food flows backwards from the lower portion to the upper portion, the backward flow can be controlled, and the rapid rise of the liquid level can be controlled.

For example, the pressure flange 36 is arranged on the periphery of filling pipe 1 below the liquid level in the tube-like packaging material 1 as shown in FIG. 5. Even if the liquid food flows backwards from the lower portion to the upper portion by rapid holding of the seal jaws and counter Jaws below the pressure flange and by rapid holding with a pair of the forming flaps, the pressure flange 36 can control the backward flow, and control the rapid rise of the liquid level, and keep the pressure of the liquid food in enough positive pressure.

By the fluctuation of the liquid food pressure, the pressure of the liquid food filled in the tube in a tube around the pressure flange is in danger of being extremely low positive pressure or negative pressure.

Figure 2:
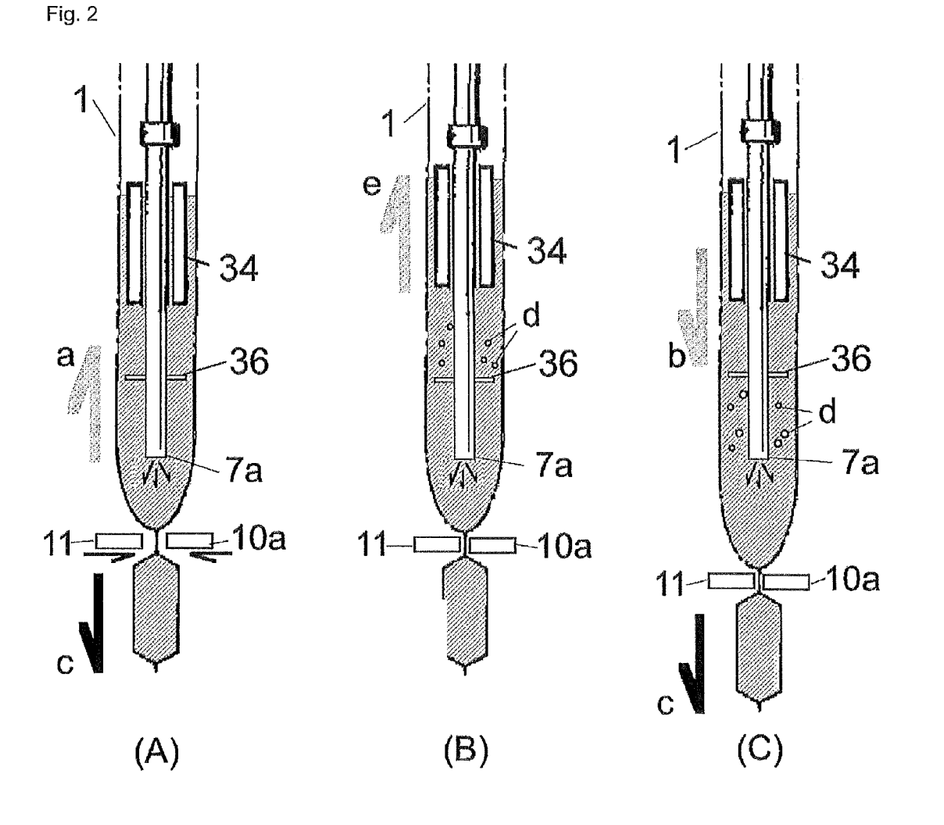
FIG. 2 is an outline sectional view showing the operation of the packaging and filling machine of the neighborhood of the pressure flange.

FIG. 2 shows general examples of the feed of the liquid food from the filling pipe 7 and the flow and movement of the liquid food in the transversal seal with the seal jaw, the counter jaw and the forming flaps. As shown in FIG. 2 (A), while the tube-like packaging material is carried to the lower portion in the direction of arrow (c), the tube is rapidly caught by the forming flaps, the seal jaws 10a and the counter jaws 11, the liquid in the tube-like packaging material is pushed, and the pressure of the liquid food in the tube rapidly rises, and the liquid flows backwards in direction of arrow (a). The pressure flange 36 controls the backward flow, and keeps the positive pressure being necessary for forming.

Because the pressure of the liquid food in the tube pass on the whole liquid food in the tube regardless of the existence of the pressure flange 36, as shown in FIG. 2 (B), the liquid in the tube flows backwards in direction of the arrow (e) by inertia. However, liquid movement from the lower portion to the upper portion of the flange is disturbed by the existence of pressure flange 36, and the liquid is lacked above the flange (at the second dropping portion), and shortage (d) is produced. The shortage (d) is illustrated in FIG. 2 (B) as virtual foams. As a result, the pressure of the liquid food filled in the tube is in danger of being extremely low positive pressure or negative pressure. The raised liquid rapidly drops due to the above-mentioned shortage, as a result, the pressure of the liquid food rises again. In this way the pitch is repeated with vibration.

Figure 3:
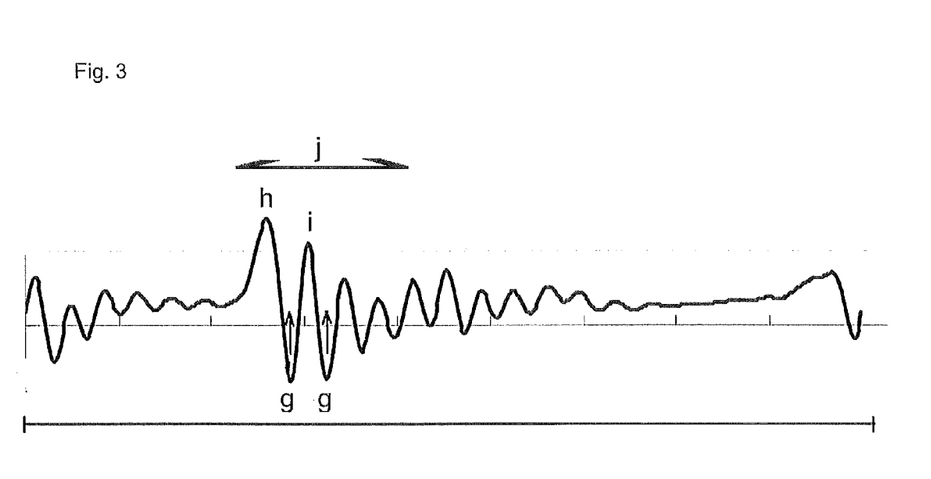
FIG. 3 is a chart with a vertical axis showing the pressure of the liquid food above the pressure flange (at the second dropping portion) in Example of the packaging and filling machine and a cross axle showing time of one cycle of the transversal seal (holding with the seal jaw and the counter jaw), preforming and cutting steps.

In an example of the packaging and filling machine, FIG. 3 is a chart with a vertical axis showing the pressure of the liquid food above the pressure flange (the second dropping portion) and a cross axle showing time of one cycle of the transversal seal (holding with the seal jaws and the counter jaws), preforming and cutting steps.

The pressure of the liquid food in the tube rapidly rises when by the rapid holding with the forming flaps, the seal jaw and the counter (in the time period (j) indicated by arrow). They correspond to peaks (h) and (i) in FIG. 3.

The pressure of the liquid food in the tube passes on the whole liquid food in the tube, and the liquid in the tube flow backwards by inertia to the upper portion. Liquid movement from the flange lower part to the top is disturbed by existence of pressure flange 36, and flange upward (the second drop point) liquid amount of is lacked, and pressure of pressure flange upward (the second drop point) liquid food becomes low. They are corresponding to bottom (g) of the pressure of the liquid food. The raised liquid rapidly drops due to the above-mentioned shortage, as a result, the pressure of the liquid food rises again. In this way the pitch is repeated with vibration.

Sequentially, as shown in FIG. 2 (C), the tube-like packaging material 1 is downward carried in the direction of an arrow (c), and a volume in the tube-like packaging material at the position below the pressure flange 36 (at the first dropping portion) increases. The liquid above the pressure flange 36 is fed in the direction of the arrow (b) (FIG. 2 (C)), unless the liquid food corresponding to the volume increment is fed by the filling pipe exit 7a. However, the pressure flange 36 disturbs the feed. As shown in FIG. 2 (C), the volume in the tube-like packaging material at the position below the pressure flange 36 (the first dropping portion) rapidly increases when the tube-like packaging material is pulled down by the seal jaw 10a and the counter jaw 11. The fed amount of the liquid food is lacked, and the shortage (d) forms. The shortage (d) is illustrated in FIG. 2 (C) as virtual foams. As a result, the pressure of the liquid food filled in the tube is in danger of being extremely low positive pressure or negative pressure.

Figure 7:
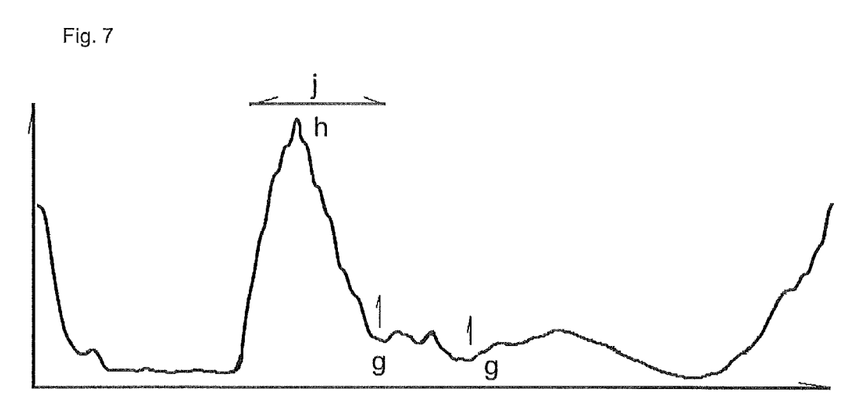
FIG. 7 is, in an example of the packaging and filling machine, a chart with a vertical axis showing the pressure of the liquid food below the pressure flange (the first dropping portion) and a cross axle showing time of one cycle of the transversal seal (holding with the seal jaws and the counter jaws), preforming and cutting steps.

In an example of the packaging and filling machine, FIG. 7 is a chart with a vertical axis showing the pressure of the liquid food below the pressure flange (the first dropping portion) and a cross axle showing time of one cycle of the transversal seal (holding with the seal jaws and the counter jaws), preforming and cutting steps.

The pressure of the liquid food in the tube rapidly rises by the rapid holding with the forming flaps, the seal jaw and the counter (in the time period (j) indicated by arrow). (See FIG. 7 Peak (h)) The volume in the tube-like packaging material at the position below the pressure flange (the first dropping portion) rapidly increases when the tube-like packaging material is pulled down by the seal jaw and the counter jaw. The fed amount of the liquid food is lacked. The pressure of the liquid food filled in the tube is in danger of being extremely low positive pressure or negative pressure. (See FIG. 7 Bottom (g))

In the features of the invention, the positive pressure keeping means absorbs fluctuation of the pressure of the liquid food in the tube below the pressure flange, and prevents the liquid food pressure from dropping in negative pressure to keep the pressure of the liquid food in the tube below the pressure flange a positive pressure.

Because the positive pressure keeping means absorbs fluctuation of the pressure of the liquid food, and prevents the liquid food pressure from dropping in negative pressure to keep the pressure of the liquid food the positive pressure, the forming flaps can make the preforming easily. Because the liquid food pressure does not decrease to negative pressure, the invasion of the outside atmosphere substance into the tube can be prevented.

In the first preferable embodiment of this invention, the pressure flange is arranged around the periphery of the filling pipe with freely up-and-down mobility according to the flow of the liquid food, for a range between the predetermined upper limit and lower limit.

Figure 1:
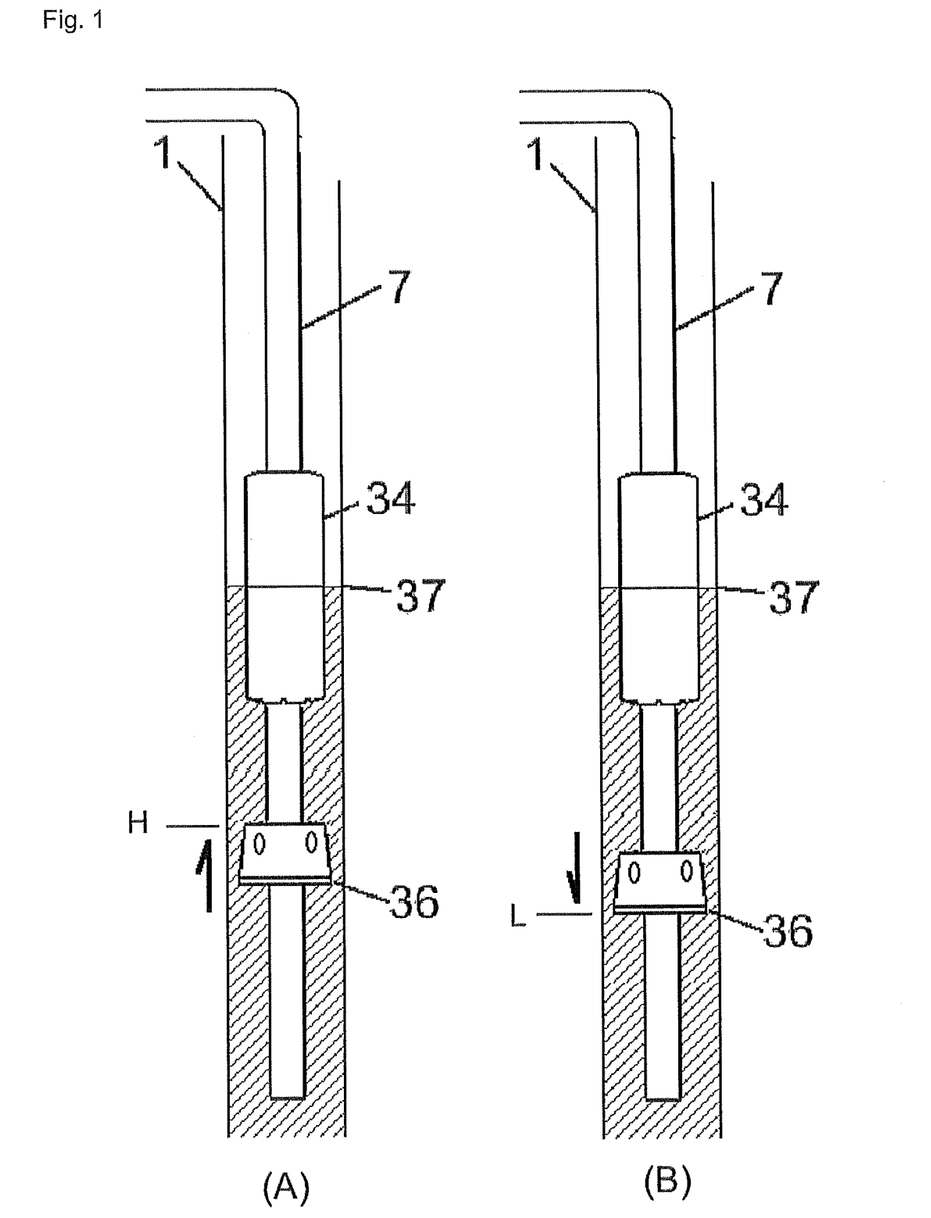
FIG. 1 is a sectional front view explaining an operation of the pressure flange of Example 1 of the packaging and filling machine in accordance with this invention.

As shown in FIG. 1 (A), when a pressure of the liquid food above the pressure flange 36 drops, the liquid moves upward, because of the freely up-and-down mobility of the pressure flange 36, the pressure flange 36 moves upward. By this movement, the volume in the tube above the pressure flange 36 decreases, and the pressure of the liquid food rises.

Because of the upper limit (H) to the movement, any excessive drop of the pressure of the liquid food below the pressure flange 36 is prevented.

As shown in FIG. 1 (B), when a pressure of the liquid food below the pressure flange 36 drops, the liquid moves downward, because of the freely up-and-down mobility of the pressure flange 36, the pressure flange 36 moves downward. By this movement, the volume in the tube below the pressure flange 36 decreases, and the pressure of the liquid food rises.

Because of the upper limit (L) to the movement, any excessive drop of the pressure of the liquid food above the pressure flange 36 is prevented.

Above-mentioned operation absorbs decrease of the liquid food pressure to negative pressure to prevent outside atmosphere substance from making an invasion into the tube.

In the second preferable embodiment of this invention, a float floating on the liquid level on periphery of the filling pipe is arranged, a cross sectional area of the float has a shape increasing upward continuously or in a stepwise.

Because a float has the shape, the volume of the float in the tube increases on the top from a bottom. By this increase, extruding of the liquid in a tube packaging material by the rapid holding of the seal jaw, the counter jaw and forming flaps is controlled, lifting speed of the liquid is moderated, and the rise of the liquid level can be controlled.

The rapid fluctuation of the liquid level is lowered by the controlling of the liquid level lift. In addition, drop of the liquid food pressure below the pressure flange can be controlled too. As a result, the elevated pressure in the aseptic chamber stops the drops to negative pressure of the liquid food pressure by periodical fluctuation of the liquid food pressure, and invasion of the outside atmosphere substance to the tube is prevented.

In preferable other embodiment of this invention, the adding adjustment means of the positive pressure keeping means adding the liquid food into the tube of the filling pipe at the lower position or the upper and lower positions about the pressure flange lower is equipped, the adding adjustment means absorbs decrease of the liquid food pressure to the negative pressure by periodical fluctuation of the liquid food pressure, and prevent any outside atmosphere substance from making an invasion into the tube.

As the above-mentioned, even if there are, in the longitudinal seal zone, the crack occurred in the splice and potential gaps, outside atmosphere substance, or any pollutant does not invade in the tube from the crack and the gap, and does not pollute the liquid food. Good hygiene state of the food is kept.

DESCRIPTION OF THE MARK

1 . . . tube-like packaging material
7 . . . filling pipe
31 . . . liquid level detecting means
32 . . . feeding means
33 . . . control means
34 . . . float
36 . . . pressure flange
37 . . . liquid level
40 . . . aseptic chamber

DESCRIPTION OF PREFERRED EMBODIMENTS

Modes of this working of invention are explained in detail as follows with reference to the drawings.

In the packaging and filling machine of this mode, as shown in FIG. 4, the web-like packaging laminated material 1 is formed to tube shape, the tube overlapped in both ends of the packaging material is longitudinally sealed along the longitudinal direction, as shown in FIG. 5, liquid food is filled up to a liquid level of a predetermined position above the outlet of filling pipe 7 from the filling pipe 7 in the tube-like packaging material conveyed vertically downward in the aseptic chamber 40, while the tube is held with seal jaws 10 and counter jaws 11 along transversal direction, as shown in FIG. 6, the tube 1 is transversally sealed, the tube is held with forming flaps 41, 41 at the same time to be preformed, the tube is cut in the transversal seal zone with knife 42, and preformed containers 13 are manufactured.

EXAMPLE

The outline of the flow control means of the Example of the packaging and filling machine in accordance with this invention is shown in FIG. 1 and FIG. 5.

The filling pipe 7 is inserted in the inside of the tube-like packaging material 1. The cylindrical float 34 is arranged to the surroundings outside the filling pipe 7. The float 34 floated in the liquid food is between the tube packaging material 1 and the filling pipe 7, and is put into the filling pipe 7 with freely up-down mobility. The detector 31 outside the tube 1 detects a position of the float 34.

In this example, sectional trapezoid-like pressure flange 36 is equipped below the liquid level in the tube-like packaging material 1, and is arranged on the filling pipe 7. The pressure flange can keep the pressure of the liquid food in the tube below the pressure flange the proper positive pressure, and make the preforming with forming flaps easy. In addition, even if the liquid food flows backwards from the lower portion to the upper portion, the backward flow can be controlled, and the rapid rise of the liquid level can be controlled.

In the embodiment, the pressure flange 36 is arranged around the periphery of the filling pipe with freely up-and-down mobility according to the flow of the liquid food, for the range between the predetermined upper limit (H) and the lower limit (L).

As shown in FIG. 1 (A), when a pressure of the liquid food above the pressure flange 36 drops, the liquid moves upward, because of the freely up-and-down mobility of the pressure flange 36, the pressure flange 36 moves upward. By this movement, the volume in the tube above the pressure flange 36 decreases, and the pressure of the liquid food rises. Because of the upper limit (H) to the movement, any excessive drop of the pressure of the liquid food below the pressure flange 36 is prevented. In above Example 1, the bottoms (g) of the liquid food pressure as shown in FIG. 3 was improved in the direction of the arrow with the pressure flange of Example 1.

As shown in FIG. 1 (B), when a pressure of the liquid food below the pressure flange 36 drops, the liquid moves downward, because of the freely up-and-down mobility of the pressure flange 36, the pressure flange 36 moves downward. By this movement, the volume in the tube below the pressure flange 36 decreases, and the pressure of the liquid food rises. Because of the lower limit (L) to the movement, any excessive drop of the pressure of the liquid food above the pressure flange 36 is prevented. As a result, the elevated pressure in the aseptic chamber stops the drops to negative pressure of the liquid food pressure by periodical fluctuation of the liquid food pressure, and invasion of the outside atmosphere substance to the tube is prevented.

In above Example, the bottom (g) as shown in FIG. 7 was improved in direction of the arrow, and the liquid food pressure below the pressure flange 36 (at the first dropping point) was raided by 18%.

Figure 8:
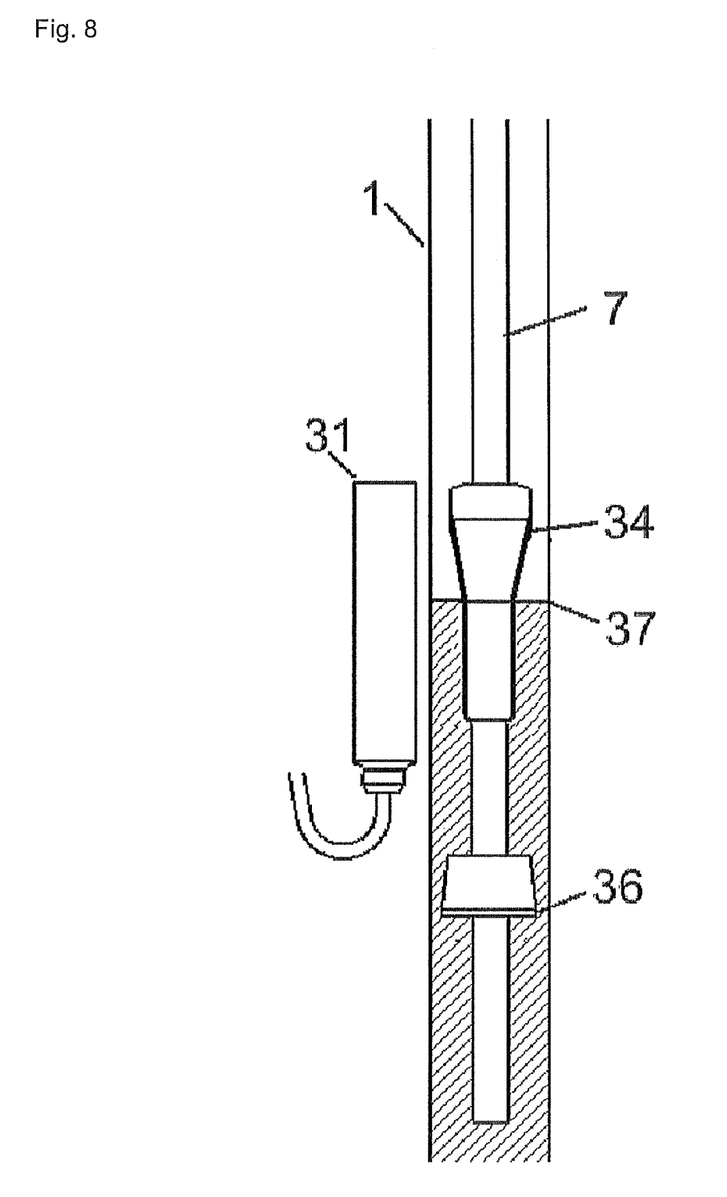
FIG. 8 is a partially sectional front view briefly explaining the float of Example 2 of the packaging and filling machine in accordance with this invention.

The outline of the flow control means of the Example of the packaging and filling machine in accordance with this invention is shown in FIG. 8 and FIG. 5.

The filling pipe 7 is inserted in the inside of the tube-like packaging material 1. The cylindrical float 34 is arranged to the surroundings outside the filling pipe 7. The float 34 floated in the liquid food is between the tube packaging material 1 and the filling pipe 7, and is put into the filling pipe 7 with freely up-down mobility. The detector 31 outside the tube 1 detects a position of the float 34.

In this example, sectional trapezoid-like pressure flange 36 (see FIG. 8) is equipped below the liquid level in the tube-like packaging material 1, and is arranged on the filling pipe 7. In addition, as shown in FIG. 5, it may be sectional plate-like pressure flange. The pressure flange can keep the pressure of the liquid food in the tube below the pressure flange the proper positive pressure, and make the preforming with forming flaps easy. In addition, even if the liquid food flows backwards from the lower portion to the upper portion, the backward flow can be controlled, and the rapid rise of the liquid level can be controlled.

In the embodiment as shown in FIG. 8, the float 34 floating on the liquid level 37 on periphery of the filling pipe 7 is arranged, a cross sectional area of the float 34 has a shape increasing upward continuously or in a stepwise. In the sectional doughnut-like of the float 34, the outside diameter becomes wide to the top from the bottom. It has a flashlight-like outside shape.

As shown in FIG. 8, because of the float shape, the volume of the float in the tube increases on the top from a bottom. By this increase, extruding of the liquid in a tube packaging material by the rapid holding of the seal jaw, the counter jaw and forming flaps is controlled, lifting speed of the liquid is moderated, and the rise of the liquid level can be controlled. The rapid fluctuation of the liquid level is lowered by the controlling of the liquid level lift. In addition, drop of the liquid food pressure below the pressure flange can be controlled too. As a result, the elevated pressure in the aseptic chamber stops the drops to negative pressure of the liquid food pressure by periodical fluctuation of the liquid food pressure, and invasion of the outside atmosphere substance to the tube is prevented.

In above Example 2, the bottoms (g) shown in FIG. 3 were improved in direction of the arrow.

The foregoing description has been presented for purposes of illustration and description. It is not intended to be exhaustive or to limit the inventions to the precise embodiments disclosed. Obvious modifications or variations are possible in light of the above teachings.

INDUSTRIAL APPLICABILITY

By the packaging and filling machine of this invention, packaged containers for liquid foods such as milk, juice, mineral water, fluid diet product can be manufactured.

The invention claimed is:
1. A packaging and filling machine, in which a web-like packaging laminated material is spliced in a splice of next web-like packaging laminated material, the web-like packaging material is fed continually and is formed to a tube shape, the tube overlapped in both ends of the packaging material is longitudinally sealed along the longitudinal direction, liquid food is filled up to a liquid level of a predetermined position above an outlet of a filling pipe from the filling pipe in the tube-like packaging material conveyed continually and vertically downward, while the tube is held with seal jaws and counter jaws along transversal direction below the liquid level, and is pulled down, the tube is transversally sealed, while the tube is held with the seal jaws and the counter jaws along transversal direction below the liquid level, the tube is held with forming flaps at the same time to be preformed, the tube is cut in the transversal seal zone, and packaged containers are manufactured, wherein
  the packaging and filling machine comprises a pressure flange and a positive pressure keeping means, the pressure flange is arranged around the periphery of the filling pipe below the liquid level in the tube-like packaging material, the pressure flange controls free flows from the lower part to the upper part of the liquid food filled in the tube to keep the pressure of the liquid food in the tube below the pressure flange a positive pressure, and to make the preforming with forming flaps easy,
  the positive pressure keeping means absorbs fluctuation of the pressure of the liquid food in the tube above the pressure flange, and prevents the liquid food pressure from dropping in negative pressure to keep the pressure of the liquid food in the tube below the pressure flange a positive pressure; and
  wherein the pressure flange is arranged around the periphery of the filling pipe with freely up-and-down mobility according to the flow of the liquid food, for range between a predetermined upper limit and lower limit, when a pressure of the liquid food above the pressure flange drops, the pressure flange moves above, when a pressure of the liquid food below the pressure flange drops, the pressure flange moves downward and, absorbs decrease of the liquid food pressure to negative pressure to prevent outside atmosphere substance from making an invasion into the tube.
2. A packaging and filling machine according to claim 1, wherein a float floating on the liquid level on periphery of the filling pipe is arranged, a cross sectional area of the float has a shape increasing upward continuously or in a stepwise, and absorbs decrease of the liquid food pressure to negative pressure to prevent outside atmosphere substance from making an invasion into the tube.

* * * * *